United States Patent Office 2,887,373
Patented May 19, 1959

2,887,373

METHOD OF CLEANING METAL SURFACES

Harry W. Winkler, Battle Creek, Mich., John W. Morfitt, Oak Ridge, Tenn., and Thomas H. Little, Philadelphia, Pa., assignors, by mesne assignments, to the United States of America as represented by the United States Atomic Energy Commission No Drawing. Application July 9, 1948
Serial No. 37,966

2 Claims. (Cl. 75—97)

Our invention relates to cleaning fluids for treating metal surfaces, and more particularly to a fluid for and a method of cleaning parts or elements of electromagnetic equipment employed in the separation of isotopes, or other apparatus employed in the treatment of uranium or other elements or compounds.

Exposed parts of electromagnetic equipment and other apparatus employed in the separation of isotopes are for the most part made from stainless steel and to a lesser extent from carbon and copper. During the course of operating this equipment the parts become pitted and contaminated with depositive material such as mixed chlorides, carbides and oxides of uranium, copper chlorides, copper, and the like, and such materials become embedded in the pitted surfaces of these parts or elements.

In the prior art it has been the practice to clean such parts by scrubbing with water and other common cleaning liquids, or to employ nitric acid alone. These methods are slow and largely ineffective since the depositive materials are largely insoluble, or at least not mutually soluble, in one of these fluids. Also, the metal parts are not mutually favorably affected by any one of these fluids.

A convenient cleaning solution is needed wherein the various metal parts of the electromagnetic equipment may be cleaned together, and the uranium values and other extraneous substances made soluble in a suitable form for recovery and eventual return to the isotope separation process. The cleaning solution must dissolve the depositive material at a fairly rapid rate and must not cause excess dissolution of the underlying metal surfaces. The solution should be one which may be made available in substantial quantities.

Organic acids have not been found to be suitable for this purpose since they form organic complexes, that is, metallo-organic complexes, with uranium, and from which it is virtually impossible to separate the uranium. For instance, peroxide precipitation could not be used to separate uranium from such complexes. On the other hand, many of the inorganic acids attack the stainless steel or other similar materials and eat them away about as fast as they would act to remove the uranium or other contamination. Hydrochloric acid is particularly active in this respect since they are usually additional residual chloride ions in the contaminating matter due to the use of chloride charge for the isotope separation. Sulfuric acid would tend to interfere with the process since it would form calcium sulfate if lime neutralization is subsequently employed, and also since it tends to form oxysulfate of iron by attacking the stainless steel parts. This makes the iron difficult to separate from the uranium, and results in an impure recycle charge material. Phosphoric acids form uranium phosphates and similar compounds which form unstable precipitates or which precipitate prematurely in the processing stages. They do not chlorinate well and are not volatile so that it is difficult to make a satisfactory recycle charge material.

Applicants with a knowledge of these problems in the prior art have for an object of their invention the provision of a cleaning liquid or fluid which will remove the depositive material, such as the mixed chlorides, carbides and oxides of uranium and metallic uranium itself in such form as is suitable for recovery in the form of a recycle charge material.

Applicants have as another object of their invention the provision of a cleaning fluid which will remove the depositive material from electromagnetically operated equipment for the separation of isotopes without dissolving appreciable quantities of the material of the parts of the equipment.

Applicants have as a further object of their invention the provision of a cleaning fluid which may be quickly and easily applied to the parts of the electromagnetically operated equipment to remove embedded uranium and its compounds therefrom.

Applicants have as a further object of their invention the provision of a cleaning fluid which quickly removes a thin film of the metal surface from the parts of the equipment to be cleaned, together with the depositive material thereon.

Applicants have as a still further object of their invention the provision of a cleaning fluid for the recovery of depositive material which may be recycled and which will introduce needed copper nitrate in the cycle of operations and obviate or reduce the necessity for adding $Cu(NO_3)_2$ required as a processing agent in the later steps of the process.

Other objects and advantages of our invention will appear from the following specification, and the novel features thereof will be particularly pointed out in the annexed claims.

Uranium metal and its compounds and other contamination collect on the parts of the equipment in use. Cracks form in the parts of the equipment due to thermal fatigue resulting from the periodic heating and cooling of the parts. Pitting of the parts also occurs from the corrosive gases of the charge, and additional pitting may be caused by electronic or ionic impingement. The uranium metal, its compounds, and other contaminating materials are embedded in these cracks and pitted portions and must be removed and recovered for salvage purposes.

While nitric acid may be suitable for removing this depositive material in such form that it may be readily utilized, less corrosion of the parts themselves would be desirable than if nitric acid alone were used. Also the depositive material is only slowly soluble in nitric acid so that the cleaning process would be extremely slow and laborious and would be unsuited for this purpose where substantial quantities of equipment are involved.

Then it becomes necessary to find some expedient for speeding up the cleaning process and decreasing the corrosion of the metal parts. To this end it was discovered that removal of a thin layer of contaminated surface with the depositive material thereon would serve to clean the parts. In accordance with the present invention this is accomplished by electrochemical action on the deposited material while inhibiting attack on the metal surface. To this end, a nitric acid solution is employed which contains a substantial concentration of a salt of a metal which is lower in the electrochemical series than the element whose deposits are to be removed.

When uranium compounds comprise the major deposits to be removed, a wide choice of salts is available, due to the relatively high placement of uranium in the electrochemical series. It is desirable in such cases to employ a salt of the metal comprising the sole or predominant metal of the surface to be cleaned. For example, in cleaning copper or copper alloy surfaces, it is preferred to employ a nitric acid solution of a copper salt. The mass action effect of the copper in solution thus inhibits attack on the copper surfaces being cleaned. This inhibitory action is further enhanced if the copper salt employed is copper nitrate, in which case the common ion effect serves to depress the ionization of the nitric acid and reduce its corrosiveness.

The preferred salts for use in the cleaning solutions of the present invention are therefore nitrates of metals lower in the electrochemical series than the elements whose deposits are to be removed, and especially nitrates of metals comprising predominant elements of the surfaces to be cleaned.

Our invention will be further illustrated with particular reference to nitric acid-copper nitrate cleaning agents which are especially adapted for cleaning and removing uranium deposits from parts of electromagnetic isotope separating equipment. Such agents are particularly useful for the recovery of uranium from copper surfaces and from surfaces of all metals lying between copper and uranium in the electrochemical series. An outstanding advantage of the nitric acid-copper nitrate cleaning agents is the fact that they may thus be successfully employed for cleaning various parts of equipment of different metallic composition. For example, our preferred cleaning solution may be satisfactorily employed for simultaneously cleaning copper and stainless steel parts in the same cleaning bath. In such case the stainless steel parts are preferably placed in the bottom of the bath for a relatively long period while the copper parts are given a rapid dip.

When the nitric acid-copper nitrate cleaning agents act upon surfaces contaminated with uranium compounds, a visible effect may be observed in the deposition of a film of bright copper in place of the removed deposits. This film may be redissolved by sufficiently high concentrations of nitric acid in the cleaning agent, but the efficiency of our cleaning process is independent of the retention or redissolution of this film.

Our nitric acid-copper nitrate cleaning solutions are particularly advantageous in removing uranium deposits which contain chloride ions. In the absence of copper nitrate, the introduction of chloride ions into the nitric acid cleaning solution would greatly increase its corrosiveness. The copper nitrate provided in our preferred cleaning solution, however, serves to minimize the corrosive effect of chloride ions by supplying $Cu^{++}$ to complex the $Cl^-$ as $CuCl_4^=$.

Another outstanding advantage of the nitric acid-copper nitrate cleaning solutions for the removal of uranium deposits is the fact that the resulting used solutions are especially adapted for extraction with organic solvents to recover the uranium. The coper nitrate in such solutions serves as a salting-out agent which gives rise to highly efficient uranium extraction.

The cleaning agents of the present invention may range in composition from true solutions of the salt in concentrated nitric acid to heavy pastes in which the salt may be only moistened with dilute nitric acid. In general, the salt content of our cleaning agents may range from 10% to 90%, but preferably from 10% to 40% by weight, anhydrous basis, and the balance of the composition may comprise nitric acid of any strength from extremely dilute up to commercial concentrated strengths.

Our preferred nitric acid-copper nitrate cleaning solutions contain $H_2O$, $HNO_3$, and $Cu(NO_3)_2$ in weight ratios of the order of 2:1:1, respectively. Thus, a solution which has been successfully employed for cleaning copper and stainless steel parts has the composition 50.6% $H_2O$, 23.8% $HNO_3$, and 25.6% $Cu(NO_3)_2$. Such a solution may be prepared, for example, from 34% by weight of 70% nitric acid, 33% by weight of water, and 33% by weight of $Cu(NO_3)_2 \cdot 3H_2O$. A solution of this approximate composition may be more advantageously prepared, however, by dissolving one part by weight of copper turnings or other scrap copper in approximately twelve parts by weight of 12 N. nitric acid (56% $HNO_3$). The solution prepared by the latter procedure contains residual oxides of nitrogen which appear to have a beneficial catalytic effect on the cleaning action of this solution.

The cleaning agents of the present invention may be applied to the contaminated metal surfaces by any suitable procedure such as spraying, brushing, wiping, or the like. In the case of parts of apparatus which may be handled readily, the preferred procedure is to dip the parts in the cleaning solution. The time of contact, when employing any of these methods, will depend upon the nature and thickness of the deposits, the strength of the cleaning agent, and the degree of mechanical abrasion accompanying the action of the cleaning agent. Illustrative contact times for dip cleaning of uranium-contaminated parts of electromagnetic isotope separating apparatus, using the nitric acid-copper nitrate cleaning solution of the preferred composition previously given, are 5–30 seconds for copper parts and 5–15 minutes for stainless steel parts.

After a suitable contact time, excess cleaning agent may be removed from the parts by draining, centrifuging, or other suitable procedure, and the residue may then be removed by water washing.

It is to be understood, of course, that the specific cleaning agents and cleaning procedures described above are merely illustrative, and that numerous modifications may be made within the scope of the present invention. Only such limitations should be imposed on the scope of our invention as are indicated in the appended claims.

Having thus described our invention, we claim:

1. The method of removing deposits from metal surfaces which comprises subjecting said surfaces to the action of a cleaning agent consisting of aqueous nitric acid and an anhydrous nitrate salt of a metal which is lower in the electromotive series than the elements of the deposits to be removed, the concentration of said salt being from 10 to 90%, based on total weight.

2. The method of removing uranium deposits from surfaces of the class consisting of copper and copper alloys which comprises subjecting said surfaces to the action of a cleaning agent consisting of aqueous nitric acid and copper nitrate, the concentration of said copper nitrate being from 10 to 90%, based on total weight.

References Cited in the file of this patent

UNITED STATES PATENTS

| | | |
|---|---|---|
| 288,150 | Aiken | Nov. 6, 1883 |
| 1,837,118 | Elder | Dec. 15, 1931 |
| 1,994,499 | Boller | Mar. 19, 1935 |
| 2,049,517 | Saukaitis | Aug. 4, 1936 |
| 2,128,548 | White | Aug. 30, 1938 |
| 2,200,139 | White | May 7, 1940 |
| 2,408,931 | Heath et al. | Oct. 8, 1946 |

OTHER REFERENCES

Friend: "Textbook of Inorganic Chemistry," vol. VII, pt. III, pages 283, 323 (1926), publ. by Charles Griffin & Co., Ltd., London.

"International Critical Tables," vol. IV, McGraw-Hill Book Co., New York (1928), page 362.

Seidell: "Solubilities of Inorganic and Metal Organic Compounds," 3rd ed., vol. I, D. Van Nostrand Co., Inc., New York (1940), page 492.